US008861412B2

(12) United States Patent
Chen et al.

(10) Patent No.: US 8,861,412 B2
(45) Date of Patent: Oct. 14, 2014

(54) INTERFERENCE AVOIDANCE IN LOW POWER NODES (75) Inventors: Tao Chen, Espoo (FI); Christopher Peter Callender, Kinross (GB); Arto Lehti, Oulu (FI); Soni Koul, Espoo (FI)

(73) Assignee: Broadcom Corporation, Irvine, CA (US)

( * ) Notice: Subject to any disclaimer, the term of this patent is extended or adjusted under 35 U.S.C. 154(b) by 193 days.

(21) Appl. No.: 13/365,396

(22) Filed: Feb. 3, 2012

(65) Prior Publication Data
US 2013/0194986 A1 Aug. 1, 2013

(30) Foreign Application Priority Data

Jan. 30, 2012 (GB) .................................. 1201570.7

(51) Int. Cl.
G08C 17/00 (2006.01)
H04B 1/16 (2006.01)
(52) U.S. Cl.
USPC ........................................ 370/311; 455/343.1
(58) Field of Classification Search
None
See application file for complete search history.

(56) References Cited

U.S. PATENT DOCUMENTS

| 2009/0109942 A1* | 4/2009 | Wijayanathan | 370/338 |
| 2009/0137221 A1* | 5/2009 | Nanda et al. | 455/296 |
| 2009/0232019 A1* | 9/2009 | Gupta et al. | 370/252 |
| 2010/0046498 A1 | 2/2010 | Hall | 370/350 |
| 2011/0237261 A1* | 9/2011 | Meshkati et al. | 455/438 |
| 2011/0243047 A1 | 10/2011 | Dayal et al. | 370/311 |
| 2012/0069766 A1* | 3/2012 | Fu et al. | 370/252 |
| 2012/0069800 A1* | 3/2012 | Soliman et al. | 370/329 |
| 2012/0115471 A1* | 5/2012 | Awoniyi et al. | 455/435.1 |
| 2012/0164948 A1* | 6/2012 | Narasimha et al. | 455/63.1 |
| 2012/0213092 A1* | 8/2012 | Sun et al. | 370/248 |
| 2013/0028098 A1* | 1/2013 | Yuda et al. | 370/241 |

FOREIGN PATENT DOCUMENTS

| WO | WO-2009/137295 A1 | 11/2009 |
| WO | WO-2012/012583 A1 | 1/2012 |
| WO | WO-2012/041255 A1 | 4/2012 |

OTHER PUBLICATIONS

EP Search Report for corresponding GB Patent Application No. 1201570.7 mailed Jun. 25, 2012.
3GPP in R1-110687, "Interference Issues in Heterogeneous Networks for HSPA", QUALCOMM Incorporated, Taipei, Taiwan, Feb. 21-25, 2011.
"Interference Management in UMTS Femtocells", www.femtoforum.org, Femto Forum, Dec. 2008.
3GPP TR 25.820 v8.2.0, "3G Home NodeB Study Item Technical Report", Sep. 2008.
3GPP TS 25.104 v10.3.0, "Base Station (BS) radio transmission and reception (FDD)", Sep. 2011.
3GPP TS 36.213 v10.2.0, "Evolved Universal Terrestrial Radio Access (E-UTRA); Multiplexing and channel coding", Jun. 2011.

* cited by examiner

*Primary Examiner* — Eunsook Choi
(74) *Attorney, Agent, or Firm* — Stanton IP Law (57) ABSTRACT The specification and drawings present a new method, apparatus and software related product for avoiding UL interference in a victim LPN such as femtocell using DRX by the LPN coordinated with the UL DTX of UEs to the LPN and to one or more HPNs such as NBs (or Home NB), e.g., in HSPA systems. The victim LPN may start DRX having ON and OFF periods. Then the LPN sends information about DRX to its UEs (LUEs) communicating with the LPN, and to one or more network elements such as aggressor HPNs' RNCs. The network element(s) are adapted to identify and configure aggressor UEs (HUEs) communicating with one or more HPNs of the network for coordinating ON and OFF periods of the DRX by the LPN with transmissions of the LUEs and the HUEs to avoid interference during the OFF periods of the DRX in the LPN.

17 Claims, 4 Drawing Sheets

UL received power:

Prx_ul_h

UL received power:

Prx_ul_l = Prx_ul_h + 10 dB + Offset

Ptx_dl_h=43dBm

High Power Node

Ptx_dl_l=33dBm

Low Power Node

Prx_dl_h=43-PL_hu, Prx_dl_l=33-PL_lu

INTERFERENCE AVOIDANCE IN LOW POWER NODES

TECHNICAL FIELD

The exemplary and non-limiting embodiments of this invention relate generally to wireless communications and more specifically to avoiding uplink interference in low power nodes like femtocells, e.g., in HSPA systems.

BACKGROUND ART

The following abbreviations that may be found in the specification and/or the drawing figures are defined as follows:
3GPP $3^{rd}$ generation partnership project
ACK acknowledgement
BS base station
BTS base transceiver station
CN core network
DL downlink
DPCCH dedicated physical control channel
E-DCH enhanced data channel
E-UTRA evolved universal terrestrial radio access
eNB, eNodeB evolved node B/base station in an E-UTRAN system
E-UTRAN evolved UTRAN (LTE)
DTX discontinuous transmission
DRX discontinuous reception
HNB home node B
HPN high power node BS
HS-DPCCH high speed dedicated physical control channel
HUE UE served by HPN
HSPA high speed packet access
ICIC inter-cell interference coordination
LPN low power node BS
LUE UE served by LPN
LTE long term evolution
LTE-A long term evolution advanced
ICIC inter-cell interference coordination
NACK negative acknowledgement
NB Node B
O&M operations and maintenance
RACH random access channel
RAT radio access technology
RGCH relative grant channel
RNC radio network controller
ROT rise over thermal noise
Rx, RX reception, receiver
SHO soft handoff
TDM time division multiplexing
Tx, TX transmission, transmitter
UE user equipment
UL uplink
UPH UE power headroom Recently heterogeneous deployments where low power nodes are placed throughout a macro-cell layout have gained significant interest from cellular network operators as a means to enhance system performance (coverage and capacity). The co-channel heterogeneous network deployment in which small power nodes use the same carrier frequency as the macro-cell is presented for study of HSPA evolution in 3GPP in R1-110687, "Interference Issues in Heterogeneous Networks for HSPA", QUALCOMM Incorporated, Taipei, Taiwan, 21-25 Feb. 2011. Under co-channel deployment, introduction of the low power nodes to the macro-cell brings challenges in terms of the control channel (such as HS-DPCCH) reliability as well as the interference management between low and high power nodes.

From the high level architecture point of view, one scenario for the deployment of small power nodes could be a dedicated controller deployment where the macro-cells and the low power nodes are controlled by different RNCs. The dedicated controller deployment allows operators more flexible choice of vendors, and could be a valuable solution in case if the RNC runs into the issue of capacity limit and/or port connectivity limit (e.g., in the NodeB). Under this scenario, SHO will not be supported between macro-cell and small power nodes. On the positive side, there will be no control channel (such as HS-DPCCH) reliability problem. However, on the negative side, interference problems could become more severe.

The interference problems comes from the transmit power difference between low power nodes (LPNs) such as femto cell BS, and the high power nodes (HPNs) such as macro cell BS. As serving cell selection and active set management are mainly based on the DL received signal strength, transmit power of each cell largely determines the coverage area of the cell. Normally, a high transmit power nodes will cover larger area than the low transmit power nodes. However, from an UL perspective, the strength of the signal being received at each node does not rely on the DL transmit power of each node. Consequently, introduction of the low power nodes could potentially cause large UL imbalance, i.e., UL cells other than the serving cell could receive much stronger signals from the UE than the serving cell.

In the deployment of heterogeneous networks, there is potentially one problem that could arise from the introduction of the LPNs, i.e., excessive UL interference from HPN UEs (HUEs) to the low power nodes.

The excessive interference in victim LPNs is caused by the UEs being served by the HPN while not having the victim LPNs in the active set. In this case, due to the UL imbalance, the UE could still have a better UL to the small power node than to the serving cell. Not being in the active set, the SPNs could not power control the UE and/or limit the UE grant by a RGCH. Consequently, these LPNs could be the victims of a large un-controllable interference from HPNs. As a result, UEs served by the victim LPNs may suffer from bad UL throughput.

The relation between DL received powers at a UE side from the HPN and LPN can be expressed as follows:

$$Ptx\_dl\_h - PL\_hu = Ptx\_dl\_l - PL\_lu + \text{Offset} \quad (1),$$

where Ptx_dl_h is a DL transmission power from the HPN, PL_hu is a pathloss between the HPN and the UE, Ptx_dl_l is a downlink transmission power from the LPN, PL_lu is a pathloss between the LPN and the UE. Equation 1 may be further presented as $$PL\_hu - Pl\_lu = Ptx\_dl\_h - Ptx\_dl\_l - \text{Offset} \quad (2).$$

The relation between UL received powers at the HPN and LPN can be expressed as follows:

$$Prx\_ul\_l = Prx\_ul\_h + (Ptx\_dl\_h - Ptx\_dl\_l) - \text{Offset} \quad (3),$$

where Prx_ul_h is a UL received power by the HPN and Prx_ul_l is a UL received power by the LPN. Equation 3 may be further presented as $$Prx\_ul\_l = Prx\_ul\_h + \text{PowerDiff} - \text{Offset} \quad (4).$$

Figure 1:
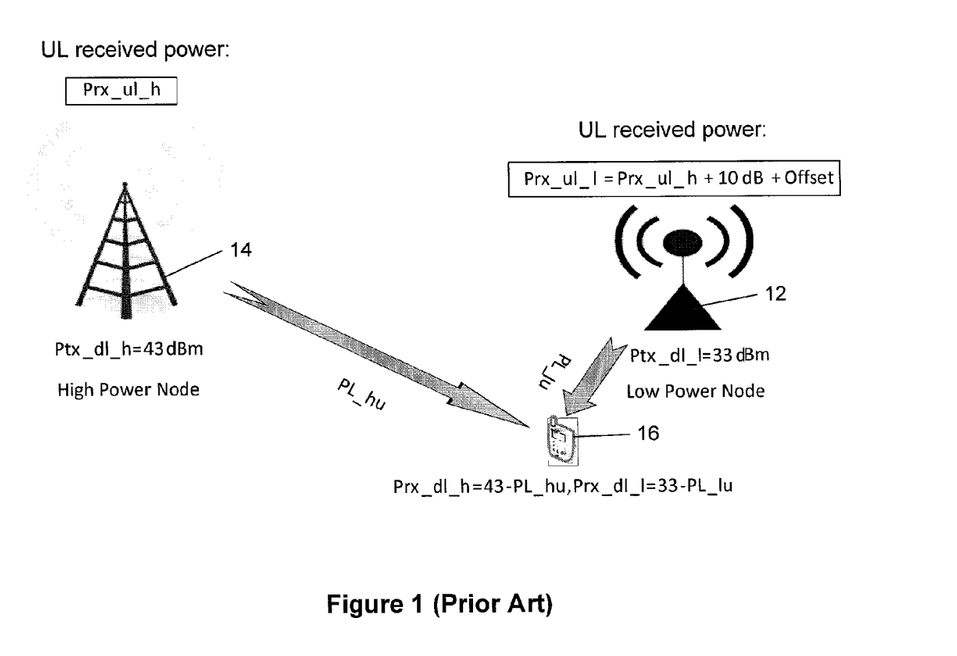
FIG. 1 is a diagram demonstrating UL interference from UE in HPN cell to LPN.

Moreover, one simple example is shown in FIG. 1 which illustrates the UL interference from the UE 16 in HPN cell to the LPN 12.

In the example of FIG. 1, the Tx power at the serving HPN 14 is assumed to be 43 dBm and the Tx power at a neighbor LPN 12 is assumed to be 33 dBm. Then the received uplink interference power at the LPN 12 from the UE 16 without SHO support can be expressed as:

$$Prx\_ul\_l = Prx\_ul\_h + 10 \text{ dB} - \text{Offset} \quad (5),$$

where Offset indicates the received power difference between the HPN 14 and LPN 12 in the DL, which is also related to the setting of a serving cell change parameter. In other words, for larger Offset values, the UE 16 is closer to the HPN 14 and the UL interference to the LPN 12 is smaller according to Equation 5. Otherwise, the uplink interference would be larger.

Some documents provide discussions related to the problem of interference described herein. For example, the conclusion from the document 3GPP TR 25.820 v8.2.0, "3G Home NodeB Study Item Technical Report", 09/2008, states the following: "The femtocell receiver must reach a compromise between protecting itself against uncoordinated interference from the macro UEs, while controlling the interference caused by its own UEs towards the macro layer. Adaptive uplink attenuation can improve performance but consideration must also be given to other system issues like the associated reduction in UE battery life."

Furthermore, some solutions mentioned in "Interference Management in UMTS Femtocells", www.femtoforum.org, Femto Forum, 12/2008, are summarized as follows:

1. Availability of alternative resources (a second carrier, or underlay RAT) for handing off or reselecting macro users is the best way to provide good service in the case where macro users are in the proximity of femtocells.

This approach implicitly relies on the escape carrier to avoid the co-channel interference which will require the multiple carriers or RATs as a tradeoff 2. The femtocell (a kind of LPN) is required to cope with UL interference from UE being served by the macrocell. An increase of 20 dB in the minimum requirements of dynamic range performance was proposed and subsequently incorporated as a performance measure to be applied, see 3GPP TS 25.104 v10.3.0, "Base Station (BS) radio transmission and reception (FDD)", 09/2011.

This approach may work for the case of only a few femto UEs. However, in case of multiple femto UEs, the unstable ROT caused by the dramatically changed interference from the aggressor UEs (served by and in communication with the HPN/BS)) will cause inefficient uplink scheduling at the BS.

SUMMARY

According to a first aspect of the invention, a method comprising: starting a discontinuous reception by a low power node having ON and OFF periods in a network; and sending by a low power node information about discontinuous reception to user equipments communicating with the low power node and to one or more network elements of the network adapted to identify based on a predefined criterion and configure further user equipments communicating with one or more high power nodes of the network, for coordinating ON and OFF periods of the discontinuous reception by the low power node with transmissions of the user equipments and the further user equipments to avoid interference during the OFF periods of the discontinuous reception in the low power node.

According to a second aspect of the invention, an apparatus comprises: at least one processor and a memory storing a set of computer instructions, in which the processor and the memory storing the computer instructions are configured to cause the apparatus to: start a discontinuous reception having ON and OFF periods in a network; and send information about discontinuous reception to user equipments communicating with the apparatus and to one or more network elements of the network adapted to identify based on a predefined criterion and configure further user equipments communicating with one or more high power nodes of the network, for coordinating ON and OFF periods of the discontinuous reception by the low power node with transmissions of the user equipments and the further user equipments to avoid interference during the OFF periods of the discontinuous reception in the low power node.

According to a third aspect of the invention, a computer readable medium comprising a set of instructions, which, when executed on a low power node in a network causes the low power node to perform the steps of: starting a discontinuous reception having ON and OFF periods in a network; and sending information about discontinuous reception to user equipments communicating with the low power node and to one or more network elements of the network adapted to identify based on a predefined criterion and configure further user equipments communicating with one or more high power nodes of the network, for coordinating ON and OFF periods of the discontinuous reception by the low power node with transmissions of the user equipments and the further user equipments to avoid interference during the OFF periods of the discontinuous reception in the low power node.

According to a fourth aspect of the invention, a method comprising: receiving by a user equipment from a low power node information about a discontinuous reception having ON and OFF periods by the low power node; and communicating by the user equipment with the low power node by configuring and coordinating uplink transmissions by the user equipment with the ON and OFF periods of the discontinuous reception by the low power node, wherein during the ON periods of the discontinuous reception the user equipment does not transmit uplink for communicating with the low power node.

According to a fifth aspect of the invention, an apparatus comprising: at least one processor and a memory storing a set of computer instructions, in which the processor and the memory storing the computer instructions are configured to cause the apparatus to: receive from a low power node information about a discontinuous reception having ON and OFF periods by the low power node; and communicate with the low power node by configuring and coordinating uplink transmissions by the user equipment with the ON and OFF periods of the discontinuous reception by the low power node, wherein during the ON periods of the discontinuous reception the apparatus is configured not to transmit uplink for communicating with the low power node.

According to a sixth aspect of the invention, a computer readable medium comprising a set of instructions, which, when executed on a user equipment causes the user equipment to perform the steps of: receiving from a low power node information about a discontinuous reception having ON and OFF periods by the low power node; and communicating with the low power node by configuring and coordinating uplink transmissions by the user equipment with the ON and OFF periods of the discontinuous reception by the low power node, wherein during the ON periods of the discontinuous reception the user equipment does not transmit uplink for communicating with the low power node.

According to a seventh aspect of the invention, a method, comprising: receiving by a network element from a low power node information about a discontinuous reception having ON and OFF periods by the low power node; and identifying based on a predefined criterion and configuring user equipments communicating with one or more high power nodes for coordinating ON and OFF periods of the discontinuous reception by the low power node with transmissions of the user equipments, wherein during the OFF periods of the discontinuous reception the user equipments are configured not to transmit uplink for communicating with the one or more high power nodes.

According to an eighth aspect of the invention, an apparatus comprising: at least one processor and a memory storing a set of computer instructions, in which the processor and the memory storing the computer instructions are configured to cause the apparatus to: receive from a low power node information about a discontinuous reception having ON and OFF periods by the low power node; and identify based on a predefined criterion and configure user equipments communicating with one or more high power nodes for coordinating ON and OFF periods of the discontinuous reception by the low power node with transmissions of the user equipments, wherein during the OFF periods of the discontinuous reception the apparatus is adapted to configure user equipments not to transmit uplink for communicating with the one or more high power nodes.

According to a ninth aspect of the invention, a computer readable medium comprising a set of instructions, which, when executed on a network element causes the network element to perform the steps of: receiving from a low power node information about a discontinuous reception having ON and OFF periods by the low power node; and identifying based on a predefined criterion and configuring user equipments communicating with one or more high power nodes for coordinating ON and OFF periods of the discontinuous reception by the low power node with transmissions of the user equipments, wherein during the OFF periods of the discontinuous reception the user equipments are configured not to transmit uplink for communicating with the one or more high power nodes.

BRIEF DESCRIPTION OF THE DRAWINGS

For a better understanding of the nature and objects of the present invention, reference is made to the following detailed description taken in conjunction with the following drawings, in which.

DETAILED DESCRIPTION

A new method, apparatus, and software related product (e.g., a computer readable memory) are presented for avoiding UL interference in a LPN such as femtocell using a discontinuous reception (DRX) by the LPN coordinated with the UL discontinuous transmission (DTX) of UEs to the LPN and to one or more HPNs such as NBs (or Home NB), e.g., in HSPA systems.

According to an embodiment of the invention, the LPN (victim LPN) may stop receiving signals periodically and start configured DRX using LPN DRX period/pattern having ON and OFF periods. Then the LPN sends information about DRX to its UEs (LUEs) communicating with the LPN, e.g., via broadcast message, and to one or more network elements such as aggressor HPNs' RNCs via Iub/Iur interface in case of Node B access architecture or via CN/O&M in case of HNB access architecture. The network element(s) are adapted to identify and configure further aggressor UEs (HUEs) communicating with one or more HPNs of the network.

The information provided by the LPN may be used then for coordinating ON and OFF periods of the discontinuous reception by the LPN with transmissions of the LUEs and the HUEs to avoid interference during the OFF periods of the DRX in the LPN.

For example, the coordination can provide that during the DRX OFF periods, the LUEs will transmit UL signals to the LPN, but the aggressor HUEs will not transmit UL signals for communicating with the one or more HPNs. During the DRX ON periods, the LUEs will not transmit (i.e., suspend transmission of) UL signals to the LPN and/or RACH signals, but the HUEs are configured to transmit UL signals for communicating with the one or more HPNs. Thus in accordance with one embodiment, the victim LPN may send the information about DRX/DTX to the one or more network elements such as RNCs of the HPNs (supported by the corresponding RNCs) via Iub/Iur interface in case of NB access architecture or via CN/O&M in case of HNB access architecture. The aggressor HUEs may be identified based on a predefined criterion, such as being within a preset distance from the LPN and/or having a power level above a threshold value. This identification can be also based on reported UPH information at the BS (eNB) and/or UL interference report at RNC.

Then each HPNs' RNC would configure the identified aggressor HUE with a DTX period/pattern aligned with the victim LPN's DRX period/pattern as explained herin. Also identification and/or configuring of HUEs may be performed by each of the HPNs itself. Thus, the transmission by the aggressor HUEs would only occur when the victim LPN is in the DRX ON period, which can avoid the interference of both control channels and data channels from the aggressor HUEs to the victim LPN. Moreover, the ROT of the victim LPN can be stable during the measurement period, which can improve the scheduling performance. (Note, there is no UL measurement during the DRX ON period.)

According to another embodiment, the LUEs would suspend the uplink transmission when the LPN is in the DRX ON period. In other words, LUEs can have the transmission only when the LPN is in the DRX OFF period. In addition, the LUEs may also suspend RACH access during the DRX-ON period.

Furthermore, the ON and OFF periods of the DRX period/pattern for the LPN may be configured or re-configured by LPN, RNC or O&M (depending on the access architecture) based on a load of LUEs and HUEs. In case of the low load of LUEs and high load of aggressor HUEs, the longer DRX ON duration can be configured, e.g., 2 ms DRX ON duration per total period of 10 ms (ON plus OFF periods). For example, if the victim LPN's DRX period is 2 ms over 10 ms, then aggressor HUE's DTX pattern can be 2 ms over 10 ms as well with the same timing. Implicitly, the synchronization between HPN and LPN would be needed. Thus, the serving HPN of the aggressor HUEs would only schedule their uplink data transmission according to a DTX period/pattern mapped from the LPN's DRX ON period.

In a further embodiment, the victim LPN may stop the DL data transmission in some subframes for which the corresponding uplink ACK/NACK feedback would fall into the DRX ON period of the LPN.

The advantages of the embodiments described herein may include (but are not limited to):
- simple and easy solution to avoid the interference in LPN,
- power saving for the victim LPN via the LPN DRX feature,
- stable ROT at the victim LPN so that the UL scheduling can be improved with more accurate interference estimation,
- the interference caused by both control channels (DPCCHs) and data channels (E-DCHs) can be efficiently avoided, and
- using TDM based uplink ICIC to improve the overall performance.

Figure 2:
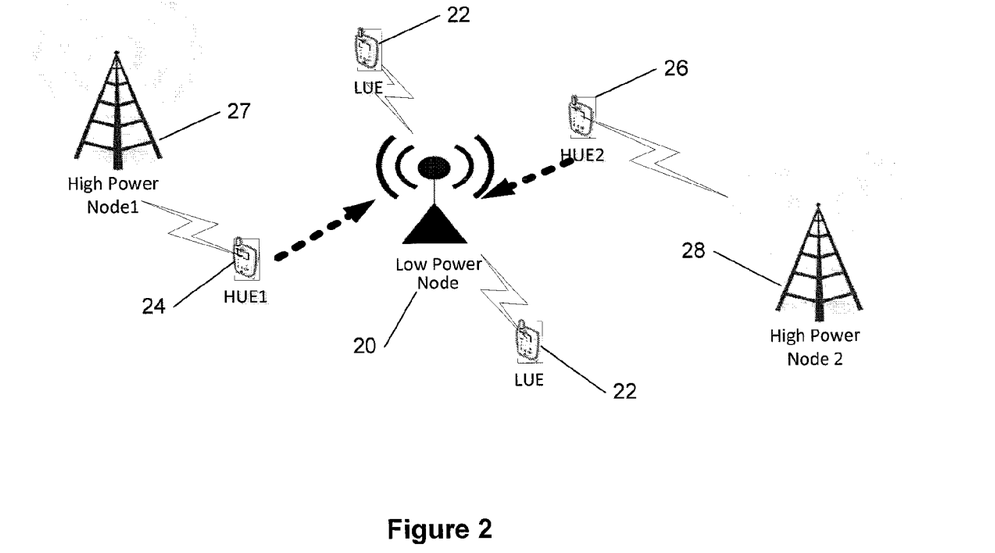
FIG. 2 is a network arrangement for avoiding UL interference signals in a victim LPN from its own LUEs and from aggressor HUEs, according to exemplary embodiments of the invention.

FIG. 2 shows network arrangement for avoiding UL interference signals in a victim LPN 20 from its own LUEs 22 and from aggressor HUEs 24 and 26, according to exemplary embodiments of the invention. As explained herein, LUEs 20 transmit their UL signals only during the DRX OFF periods of the LPN, and HUEs 24 and 26 (configured by the HPNs 27 and 28 or their respective RNCs), transmit their UL signals only during the DRX ON periods of the LPN. The HPNs 27 and 28 may be supported by the same RNC or by different RNCs (not shown in FIG. 2).

Figure 3:
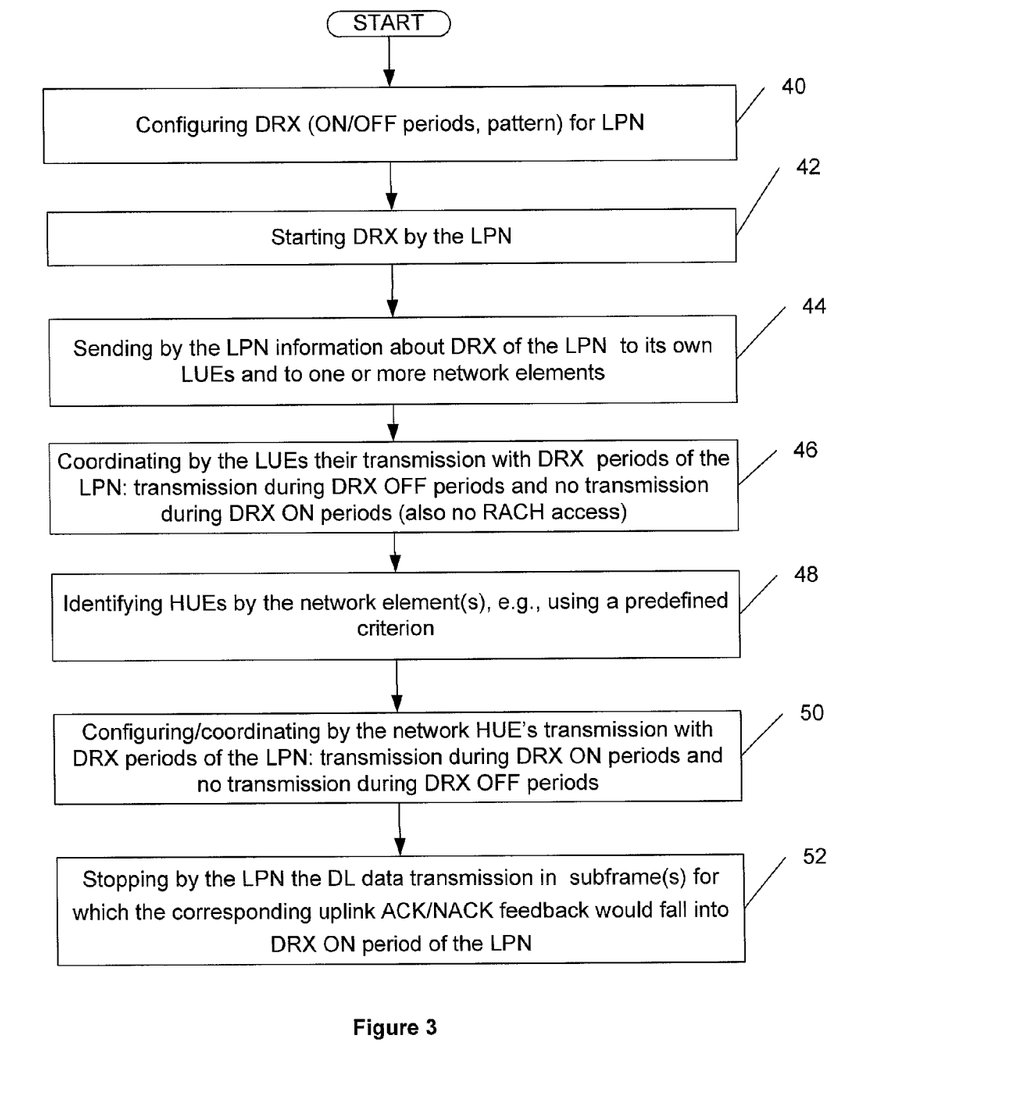
FIG. 3 is a flow chart demonstrating implementation of exemplary embodiments of the invention.

FIG. 3 shows an exemplary flow chart demonstrating implementation of some embodiments of the invention. It is noted that the order of steps shown in FIG. 3 is not required, so in principle the various steps may be performed out of the illustrated order. Also certain steps may be skipped, different steps may be added or substituted, or selected step/steps or groups of steps may be performed separately.

In a method according to this exemplary embodiment, as shown in FIG. 3, in a first step 40, DRX (having ON/OFF periods) for a LPN (victim LPN) is configured by the LPN (or by its RNC). In a next step 42, the victim LPN starts DRX operation with ON and OFF periods. In a next step 44, the LPN sends information about DRX (pattern, ON and OFF periods) to its own UEs, LUEs (e.g., via the broadcast message), and to one or more network elements (such as aggressor HPNs' RNC) via Iub/Iur interface in case of NB access architecture or via CN/O&M in case of HNB access architecture).

In a next step 46, each LUE coordinates its transmission with DRX periods of the LPN: transmitting to the LPN during the DRX OFF periods and not transmitting during the DRX ON periods (also not transmitting the RACH access). In a next step 48, the network elements(s) identify one or more HUEs communicating with one or more HPNs using a predefined criterion and/or based on the performance reports as described herein. In a next step 50, the network configures and coordinates HUE's transmission with DRX periods of the LPN: transmitting to the corresponding HPNs during the DRX ON periods and not transmitting during the DRX OFF periods. In a next step 52, the LPN stops the DL data transmission in subframe(s) for which the corresponding uplink ACK/NACK feedback would fall into the DRX ON period of the LPN.

Figure 4:
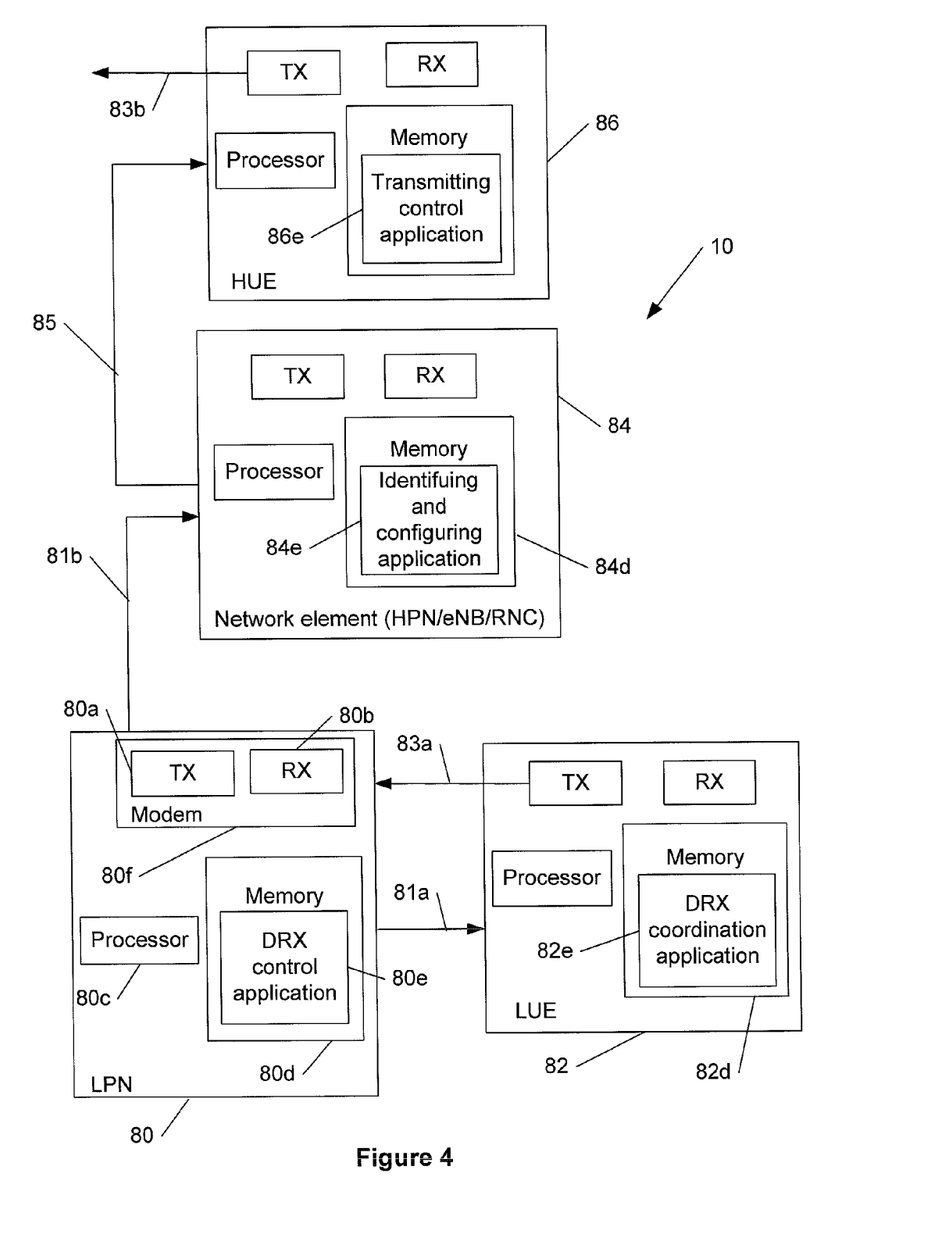
FIG. 4 is a block diagram of wireless devices for practicing exemplary embodiments of the invention.

FIG. 4 shows an example of a block diagram demonstrating LTE devices comprised in a network 10 including a LPN 80, a LUE 82, a network element 84 (HPN such as eNB or its RNC) and a HUE 86, according to an embodiment of the invention. FIG. 4 is a simplified block diagram of various electronic devices that are suitable for practicing the exemplary embodiments of this invention, e.g., in reference to FIGS. 2-3, and a specific manner in which components of an electronic device are configured to cause that electronic device to operate. Each of the UEs 82 and 86 may be implemented as a mobile phone, a wireless communication device, a camera phone, a portable wireless device and the like.

The LPN 80 comprises at least one transmitter 80a at least one receiver 80b, at least one processor 80c at least one memory 80d and a DRX control application module 80e. The transmitter 80a and the receiver 80b and corresponding antennas (not shown in FIG. 4) may be configured to provide wireless communications with the LUE 82 and the network element 84 according to the embodiment of the invention. The transmitter 80a and the receiver 80b may be generally means for transmitting/receiving and may be implemented as a transceiver, or a structural equivalence thereof. It is further noted that the same requirements and considerations are applied to transmitters and receivers of the devices 82, 84 and 86.

Furthermore, the LPN 80 may further comprise communicating means such as a modem 80f, e.g., built on an RF front end chip of the LPN 80, which also carries the TX 80a and RX 80b for bidirectional wireless communications wireless links 81a and 81b (for implementing step 44 in FIG. 3) with the devices 82 and 84 respectively. A similar concept is applicable to the devices 82, 84 and 86 shown in FIG. 4.

Various embodiments of the at least one memory 80d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80c include but are not limited to general purpose computers, special purpose computers, microprocessors, digital signal processors (DSPs) and multi-core processors. Similar embodiments are applicable to memories and processors in other devices 82, 84 and 86 shown in FIG. 4.

The DRX control application module 80e may provide various instructions for performing steps 40-44 and 52 shown in FIG. 3. The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 80e may be implemented as a separate block or may be combined with any other module/block of the LPN 80, or it may be split into several blocks according to their functionality.

The devices 82, 84 and 86 may have similar components as the LPN 80, as shown in FIG. 4, so that the above discussion about components of the LPN 80 is fully applicable to the components of the devices 82, 84 and 86.

Moreover, the coordination application module 82e in the LUE 82 may provide various instructions for performing step 46 in FIG. 3. The module 82e may be implemented as an application computer program stored in the memory 82d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. The module 82*e* may be implemented as a separate block or may be combined with any other module/block of the LUE 82, or it may be split into several blocks according to their functionality.

Moreover, the identifying and configuring module 84*e* in the network element 84 may provide various instructions for performing steps 48-50 in FIG. 3. The module 84*e* may be implemented as an application computer program stored in the memory 84*d*, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. The module 84*e* may be implemented as a separate block or may be combined with any other module/block of the network element 84, or it may be split into several blocks according to their functionality.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method for operating a low power network access node, comprising:
    starting by a low power network access node a discontinuous reception pattern assigned to the low power network access node, the discontinuous reception pattern having ON and OFF periods;
    sending from the low power network access node information about the discontinuous reception pattern to user equipments served by the low power network access node and to one or more network elements; and
    identifying, based on a predefined criterion, further user equipments that are served by one or more high power network access nodes;
    where the information is used for coordinating ON and OFF periods of the discontinuous reception pattern by the low power network access node according to the pattern with transmissions of the user equipments and with the further user equipments to avoid interference during the OFF periods of the discontinuous reception pattern in the low power network access node,
    and where during the OFF periods of the discontinuous reception pattern the user equipments are allowed to transmit uplink to their serving low power network access node and the further user equipments use the information to avoid transmitting uplink to their serving one or more high power network access nodes.

2. The method of claim 1, wherein during the ON periods of the discontinuous reception pattern the user equipments do not transmit uplink to their serving low power network access node and the further user equipments are configured to transmit uplink to their serving one or more high power network access nodes.

3. The method of claim 2, wherein during the ON periods of the discontinuous reception pattern the user equipments do not transmit on a random access channel.

4. The method of claim 1, wherein each of the one or more network elements comprises either one of the one or more high power network access nodes or a radio network controller.

5. The method of claim 1, wherein a pattern of the ON and OFF periods of the discontinuous reception pattern is configured based on a load of the user equipments and the further user equipments.

6. The method of claim 5, wherein a pattern of the ON and OFF periods of the discontinuous reception pattern is configured by the low power network access node or by a radio network controller.

7. The method of claim 1, wherein the ON period is 2 ms over ON+OFF period of 10 ms.

8. The method of claim 1, further comprising:
    stopping by the low power network access node a downlink data transmission of a subframe if a corresponding ACK/NACK feedback signal will be received by the low power network access node during any of the ON periods of the discontinuous reception pattern.

9. An apparatus comprising:
    at least one processor and a memory storing a set of computer instructions, in which the processor and the memory storing the computer instructions are configured to cause a low power network access node comprising the apparatus to:
    start a discontinuous reception pattern assigned to the low power network access node, the discontinuous reception pattern having ON and OFF periods; and
    send information about the discontinuous reception pattern to user equipments served by the low power network access node and to one or more network elements; and
    identify, based on a predefined criterion, further user equipments that are served by one or more high power network access nodes;
    where the information is used for coordinating ON and OFF periods of the discontinuous reception pattern by the low power network access node with transmissions of the user equipments and with the further user equipments to avoid interference during the OFF periods of the discontinuous reception pattern in the low power network access node,
    and where during the OFF periods of the discontinuous reception pattern the user equipments are allowed to transmit uplink to their serving low power network access node and the further user equipments use the information to avoid transmitting uplink to their serving one or more high power network access nodes.

10. The apparatus of claim 9, wherein during the ON periods of the discontinuous reception pattern the user equipments do not transmit uplink to their serving low power network access node, and the further user equipments are configured to transmit uplink to their serving one or more high power network access nodes.

11. The apparatus of claim 9, wherein the ON and OFF periods of the discontinuous reception pattern are configured based on a load of the user equipments and the further user equipments.

12. The apparatus of claim 11, wherein the processor and the memory storing the computer instructions are configured to cause the low power network access node to configure the ON and OFF periods of the discontinuous reception pattern.

13. The apparatus of claim 9, wherein the processor and the memory storing the computer instructions are configured to further cause the low power network access node to:
  stop downlink data transmission of a subframe if a corresponding ACK/NACK feedback signal will be received by the low power network access node during any of the ON periods of the discontinuous reception pattern.

14. A method, comprising:
  receiving, by a user equipment from a low power network access node serving the user equipment, information about a discontinuous reception pattern having ON and OFF periods, where the discontinuous reception pattern is assigned to the low power network access node; and
  communicating by the user equipment with the low power network access node by coordinating uplink transmissions by the user equipment with the ON and OFF periods of the discontinuous reception pattern,
  wherein during the ON periods of the discontinuous reception pattern the user equipment does not transmit uplink for communicating with the low power network access node,
  and wherein the ON period is 2 ms over ON+OFF period of 10 ms.

15. The method of claim 14, wherein during the ON periods of the discontinuous reception pattern, the user equipment does not transmit random access channel access signals.

16. An apparatus comprising:
  at least one processor and a memory storing a set of computer instructions, in which the processor and the memory storing the computer instructions are configured to cause a user equipment comprising the apparatus to:
  receive, from a low power network access node serving the user equipment, information about a discontinuous reception pattern having ON and OFF periods, where the discontinuous reception pattern is assigned to the low power network access node; and
  communicate with the low power network access node by coordinating uplink transmissions by the user equipment with the ON and OFF periods of the discontinuous reception pattern,
  wherein during the ON periods of the discontinuous reception pattern the user equipment is configured to not transmit uplink for communicating with the low power access node,
  and wherein the ON period is 2 ms over ON+OFF period of 10 ms.

17. The apparatus of claim 16, wherein the processor and the memory storing the computer instructions are further configured to cause the user equipment, during the ON periods of the discontinuous reception pattern, to not transmit random access channel access signals.

* * * * *